United States Patent [19]

Levi

[11] 3,912,878

[45] Oct. 14, 1975

[54] CAPACITIVE COUPLING NETWORK

[75] Inventor: Israel Levi, Ottawa, Canada

[73] Assignee: Northern Electric Company Limited, Montreal, Canada

[22] Filed: Sept. 9, 1974

[21] Appl. No.: 504,458

[52] U.S. Cl. .......... 179/170 R; 333/80 R

[51] Int. Cl.$^2$ .......... H04B 3/16

[58] Field of Search ........ 179/170 R, 170 D, 170 G, 179/170 NC; 333/80 R, 24 C, 80 T

[56] References Cited

UNITED STATES PATENTS

| | | | |
|---|---|---|---|
| 3,578,911 | 5/1971 | Bender | 333/80 T |
| 3,778,563 | 12/1973 | Bise et al. | 179/170 D |
| 3,828,281 | 8/1974 | Chambers | 179/170 G |
| 3,832,654 | 8/1974 | Kiko | 333/80 R |

OTHER PUBLICATIONS

Philbrick Manual for Operational Amplifiers, 2nd Edition 1966, pp. 96 and 97.

*Primary Examiner*—Kathleen H. Claffy
*Assistant Examiner*—Randall P. Myers
*Attorney, Agent, or Firm*—John E. Mowle

[57] ABSTRACT

A capacitive coupling network utilizing a positive capacitor connected in series with a slightly larger magnitude negative capacitor; the latter being arranged to saturate when the applied voltage exceeds a selected value so that the overall capacity of the network is drastically reduced for large magnitude signals.

4 Claims, 3 Drawing Figures

CAPACITIVE COUPLING NETWORK

This invention relates to a capacitive coupling network utilizing a negative capacitor which is particularly adapted for shunting voice frequency signals across a telephone line for repeating purposes with negligible dial pulse distortion.

BACKGROUND OF THE INVENTION

In the design of voice frequency two-wire repeaters for telephone lines it is necessary to maintain a d-c path through the repeater for switching and signalling functions. In order not to unnecessarily distort the low-frequency switching and dial-pulse signals, the telephone line and equipment must present as little series resistance and inductance and/or shunt capacitance as possible. On the other hand, relatively high series inductance and shunt capacitance are required in order to provide coupling to the voice-frequency amplifiers in the repeater.

Present day negative impedance repeaters have successfully vied with hybrid designs mainly because of their lower shunt capacitance requirements. The typical shunt capacitance of a hybrid repeater is 2$\mu$F compared to approximately 0.3$\mu$F for the negative impedance type. However, the hybrid repeater has a better transmission performance and a higher application potential than the negative impedance repeater, but its 2$\mu$F shunt capacitance while minimal for voice-frequency signals is excessive for the low frequency dial pulse signals thereby causing a very high dialling error rate which has severely restricted its use.

STATEMENT OF THE INVENTION

The present invention provides a level dependent capacitive coupling network which, when substituted for the mid-point capacitor in a voice-frequency hybrid repeater, provides a relatively large shunt capacitance at lower level voice frequency signals and a relatively small shunt capacitance for higher level low frequency dial pulse signals. The principles of the invention are equally applicable to either capacitive coupling or shunting networks both within and without the telephone industry where there are similar requirements.

Thus, the capacitive coupling network in accordance with the present invention comprises: a positive capacitor and a negative capacitance network connected in series. The negative capacitance network has a larger absolute capacity than the positive capacitor and is arranged to saturate when the signal voltage across the network is greater than a preselected voltage. The network functions as a positive capacitance of greater capacity than the positive capacitor for signals less than the preselected voltage, and as a positive capacitance of lesser capacity than the positive capacitor for signals greater than the preselected voltage. In a telephone transmission system, placing the capacitive coupling network across the d-c bypass leads of a repeater coil in a hybrid repeater, would result in a higher shunting capacitance for the lower magnitude voice signals and a lower shunting capacitance for the higher magnitude dial pulse signals, thereby providing improved transmission performance and negligible dial pulse distortion.

BRIEF DESCRIPTION OF THE DRAWINGS

An example embodiment of the invention will now be described with reference to the accompanying drawings in which.

DESCRIPTION OF THE PREFERRED EMBODIMENT

Figure 2:
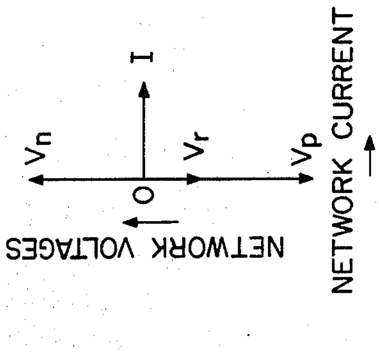
FIG. 2 illustrates the voltage-current relationship across the basic components of the capacitive coupling network illustrated in FIG. 1.

In the description and drawings, several of the components are identified by reference characters which correspond to the symbols used in the subsequent equations.

Figure 1:
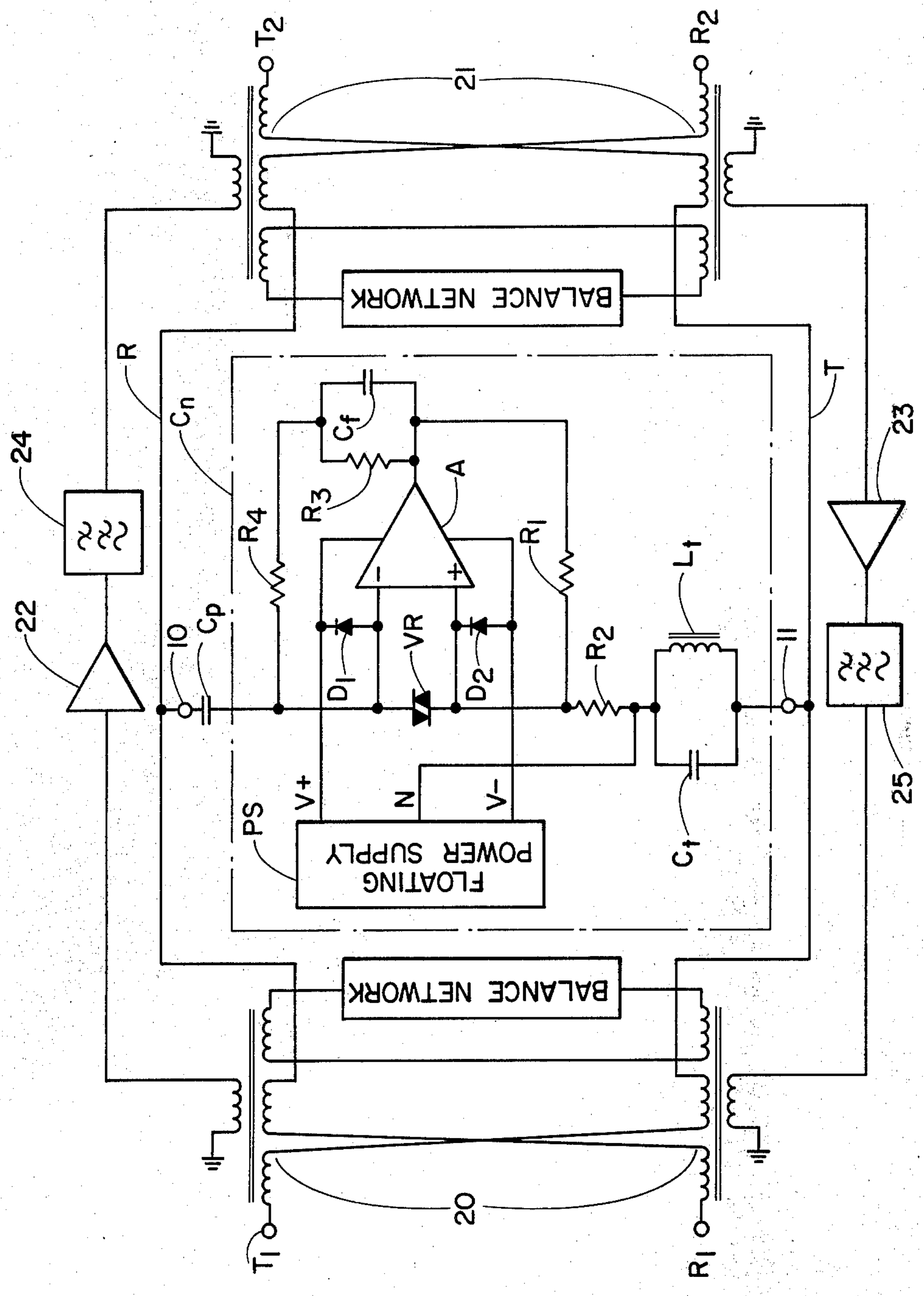
FIG. 1 illustrates a schematic and block circuit diagram of a capacitive coupling network which forms part of a two-wire hybrid repeater.

Referring to FIG. 1, the capacitive coupling network is shown connected across the tip T and ring R bypass leads of a telephone line between terminals 10 and 11 and basically comprises a positive capacitor $C_p$ connected in series with a negative capacitor $C_n$ of slightly larger absolute magnitude. The coupling network is shown as forming part of a bidirectional two-wire hybrid repeater in a telephone transmission system, the detailed structure of which will be readily apparent from the following description of its function and operation.

During operation of the repeater, both dial pulse and voice frequency signals are coupled to either the $T_1$, $R_1$ or $T_2$, $R_2$ leads of the telephone line. The voice frequency signals are coupled through the appropriate windings of the hybrid transformers 20 and 21, the amplifiers 22 and 23, the low-pass filters 24 and 25 and appear across the outgoing $T_2$, $R_2$ or $T_1$, $R_1$ leads in a well known manner.

Because the low frequency dial pulse signals are transmitted by pulsing the d-c on the telephone line, it is necessary to provide a d-c path along the T and R bypass leads through the hybrid repeater. In addition, an a-c path must be provided between the T and R bypass leads in order to complete an a-c path for the voice frequency signals across the input and output windings of the hybrid transformers 20 and 21.

In the past, this latter requirement has been met by connecting a 2$\mu$F capacitor in shunt with the line between terminals 10 and 11. However, such a capacitor provides marginal coupling at voice frequencies, and it would be preferable to utilize a 4$\mu$F capacitor. It will be apparent however that this 2$\mu$F capacitor also shunts the low frequency dial pulse signals which severely distorts them and has in the past caused a relatively high dialling error rate. This could be overcome by reducing the 2$\mu$F shunting capacitance by an order of magnitude. However, this is incompatible with the requirements for the voice frequency signals. Consequently, the present-day use of 2$\mu$F capacitors between the T and R bypass leads provides a relatively poor compromise for the divergent dial pulse and voice signal requirements.

The capacitive coupling network comprising the positive capacitor $C_p$ connected in series with the slightly larger absolute magnitude negative capacitor $C_n$ between terminals 10 and 11 effectively overcomes this seemingly paradoxical situation. The resulting equivalent capacitance $C_r$ is given by the equation:

$$C_r = \frac{C_n C_p}{C_n + C_p} \quad (1)$$

If $C_p = 0.2\mu F$ and $C_n = -0.21\mu F$ then $C_r = 4.2\mu F$.

This provides satisfactory shunting of the voice frequency signals across the T and R bypass leads of the telephone line to complete the a-c path through the hybrid transformers 20 and 21. However, such a large capacitance would badly distort the low frequency dial pulse signals which are generated by interrupting the d-c on the telephone line at approximately a 10 Hz rate.

This additional problem is overcome in the present invention by arranging the negative capacitor $C_n$ such that its active portion saturates in the presence of low frequency high level signals such as the dial pulses. When the negative capacitor $C_n$ is saturated, it functions substantially as a positive capacitor so that the total capacitance of the two capacitors $C_n$ and $C_p$ in series is slightly less than that of the positive capacitor $C_p$ alone. Since the positive capacitor $C_p$ has a value of only $0.2\mu F$, dial pulse signals pass through the hybrid repeater substantially undistorted.

The negative capacitor $C_n$ is derived from a plurality of components which coact as a negative capacitance network. It is of a basically known design and includes an operational amplifier A which is driven from a floating power supply PS which provides both positive V+, negative V− and neutral N outputs. Positive feedback is obtained via a resistive divider network comprising resistors $R_1$ and $R_2$ while negative feedback is obtained via a capacitor $C_f$ which is in shunt with a relatively large resistor $R_3$ and in series with a small build-out resistor $R_4$. The magnitude of the negative capacitor $C_n$ is determined by the values of the feedback network components, $C_f$, $R_1$, $R_2$, $R_3$, $R_4$, and is approximately equal to:

$$C_n \simeq -C_f \frac{R_1}{R_2} \quad (2)$$

Voltage limiting diodes $D_1$ and $D_2$ together with varistor VR provide 60 Hz surge and lightning protection. In addition, a tank circuit consisting of a capacitor $C_t$ and an inductor $L_t$ guards against saturation of the negative capacitor $C_n$ by 60 Hz hum which might exist on poorly balanced telephone lines.

When the negative capacitor $C_n$ is unsaturated, the voltage $V_n$ supplied by the negative capacitor $C_n$, the voltage drop $V_r$ across the capacitive coupling network and the voltage drop $V_p$ across the positive capacitor $C_p$, are given as follows:

$$V_p = V_r \frac{C_r}{C_p} \quad (3)$$

$$V_r = V_p - V_n \quad (4)$$

$$V_n = V_r\left(\frac{C_r}{C_p} - 1\right) \quad (5)$$

Since the resultant capacitor $C_r$ is larger than the positive capacitor $C_p$ when $C_n$ is unsaturated, both the voltages $V_p$ and $V_n$ are larger than the applied voltage $V_r$ as shown in FIG. 2. It will be evident that as the absolute value of the negative capacitor $C_n$ approaches that of the positive capacitor $C_p$, very large voltage swings are required from the negative capacitor $C_n$. The signal handling capability of the negative capacitor $C_n$ is given by the equation:

$$|V_n|_{sat} = V_s \frac{R_2}{R_1 + R_2} \quad (6)$$

where: $V_s$ = the output saturation voltage of the operational amplifier A. When the operational amplifier A is in saturation, the negative capacitor $C_n$ ceases to function as such and looks more like a positive capacitor having a value substantially equal to that of the feedback capacitor $C_f$. The negative capacitor $C_n$ easily saturates when low frequency dial pulse signals are applied, because it results in voltage swings greater than $|V_n|_{sat}$.

Figure 3:
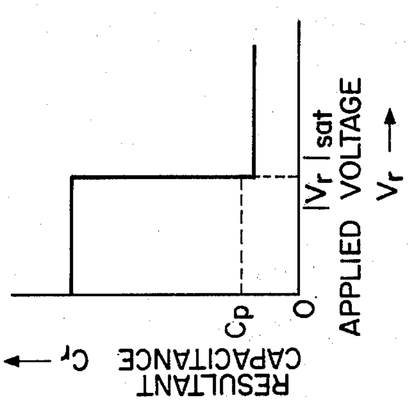
FIG. 3 illustrates the capacitive characteristics of the coupling network illustrated in FIG. 1.

The characteristics of a level dependent negative capacitor $C_n$ are shown in FIG. 3. The resultant saturating voltage $|V_r|_{sat}$ across the network is given by the equation:

$$|V_r|_{sat} = |V_n|_{sat} \frac{C_p}{C_r - C_p} \quad (7)$$

Upon application of low frequency dial pulse signals, the applied voltage $V_r$ increases beyond $|V_r|_{sat}$ which causes a drop in the resultant capacitance from $C_r$ to slightly less than $C_p$.

Typical non-limiting values of the components which may be used to provide a shunting network for a two-wire hybrid repeater are as follows:

| | |
|---|---|
| $R_1 = 3.36K\Omega$ | $C_f = 1.0\mu F$ |
| $R_2 = 16K\Omega$ | $C_p = 0.2\mu F$ |
| $R_3 = 3M\Omega$ | $C_t = 4\mu F$ |
| $R_4 = 1\Omega$ | $L_t = 1.75H$ |
| V+ = 22V | V− = −22V |

What is claimed is:

1. A capacitive coupling network, for shunting lower magnitude voice signals and higher magnitude dial pulse signals across the bypass leads in a hybrid repeater, comprising:

a positive capacitor and a negative capacitance network connected in series across the bypass leads, the negative capacitance network having a larger absolute magnitude than the positive capacitor, and including an amplifier and a resistive-capacitive network which coact to provide said negative capacitance network, the amplifier being adapted to saturate upon application of said higher magnitude dial pulse signals to said capacitive coupling network whereupon the negative capacitance network presents a positive capacitance; and thereby said capacitive coupling network presents a shunting capacitance which is higher than said positive capacitor to said lower magnitude voice signals and a shunting capacitance which is lower than said positive capacitor to said higher magnitude dial pulse signals.

2. A capacitive coupling network as defined in claim 1 in which the amplifier has an inverting input connected to one terminal of the negative capacitance network and a non-inverting input connected in series with a first resistor to a neutral terminal of the negative capacitance network; and which includes a second resistor connected between the output of the amplifier and the non-inverting input; an impedance determining capacitor, and means for connecting the impedance determining capacitor between the output and inverting input of the amplifier.

3. A capacitive coupling network for shunting a transmission line comprising:

a positive capacitor and a negative capacitance network connected in series, the negative capacitance network having a larger absolute capacity than the positive capacitor, and including an active element which saturates when the signal voltage across said capacitive coupling network is greater than a preselected voltage whereupon the negative capacitance network presents a positive capacitance;

whereby said capacitive coupling network functions as a positive capacitance of greater capacity than said positive capacitor for signals less than said preselected voltage, and as a positive capacitance of lesser capacity than said positive capacitor for signals greater than said preselected voltage.

4. A capacitive coupling network as defined in claim 3 in which the active element is an amplifier having an inverting input connected to one terminal of the negative capacitance network and a non-inverting input connected in series with a first resistor to a neutral terminal of the negative capacitance network; and which includes a second resistor connected between the output of the amplifier and the non-inverting input; an impedance determining capacitor, and means for connecting the impedance determining capacitor between the output and inverting input of the amplifier.

* * * * *